United States Patent
McKeen et al.

(10) Patent No.: US 6,321,253 B1
(45) Date of Patent: Nov. 20, 2001

(54) SYSTEMS AND METHODS FOR SIMULTANEOUS NETWORK MANAGEMENT OF VOICE AND DATA SIGNALS

(75) Inventors: Wilbert John McKeen, Ottawa; Norman Ladouceur, Iroquois, both of (CA)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/165,351

(22) Filed: Oct. 2, 1998

(51) Int. Cl.[7] .................................................. G06F 13/00
(52) U.S. Cl. ................................. 709/204; 709/245
(58) Field of Search ................................. 709/200, 201, 709/202, 238, 204–205, 227, 245; 370/392, 408, 60.1; 379/89, 88, 22

(56) References Cited

U.S. PATENT DOCUMENTS

| | | | |
|---|---|---|---|
| 5,317,628 | * 5/1994 | Misholi et al. | 379/89 |
| 5,490,140 | * 2/1996 | Abensour et al. | 370/60.1 |
| 5,675,507 | * 10/1997 | Bobo, II | 709/206 |
| 5,689,553 | * 11/1997 | Ahuja et al. | 379/202 |
| 5,740,231 | * 4/1998 | Cohn et al. | 379/88.22 |
| 5,758,070 | * 5/1998 | Lawrence | 709/220 |
| 5,838,683 | * 11/1998 | Corley et al. | 370/408 |
| 5,857,072 | * 1/1999 | Crowle | 709/203 |
| 5,941,951 | * 8/1999 | Day et al. | 709/233 |
| 5,978,373 | * 11/1999 | Hoff et al. | 370/392 |
| 5,978,806 | * 11/1999 | Lund | 707/10 |
| 5,978,835 | * 11/1999 | Ludwig et al. | 709/204 |
| 5,999,934 | * 12/1999 | Cohen et al. | 707/100 |
| 5,999,965 | * 12/1999 | Kelly | 709/202 |
| 6,006,318 | * 12/1999 | Hansen et al. | 712/28 |

FOREIGN PATENT DOCUMENTS

| | | |
|---|---|---|
| 0 612 174 A2 | 8/1994 | (EP) . |
| 0 669 742 A2 | 8/1995 | (EP) . |
| 5276199 | * 10/1993 | (JP) . |
| WO 96 28920 | 9/1996 | (WO) . |
| 9818237 | * 4/1998 | (WO) .............................. H04L/12/28 |

OTHER PUBLICATIONS

Journal artical: MCI, Cisco, IBM team up on SNA . Jul. 1998.*
Journal artical: Multimedia dispatching management network system in Northeast Electric Power Network by Zhang Rui. Oct. 1999.*
J. Tao, et al.: "Internet Access Via Baseband and Broadband ISDN Gateways", Institue of Electrical and Electronics Engineers, Proceedings of the Annual International Phoenix Conference on Computers and Communications, Phoenix, Arizona, Apr. 12–15, 1994, No. Conf. 13, pp. 485–490.
T. Doty: "A Firewall Overview", *ConneXions*, vol. 9, No. 7, Jul. 1, 1995, pp. 20–23.
European Patent Office, Standard Search Report dated Jul. 20, 1999, file No. RS 103114 CA.
S. Saunders: "PBXS and Data: The Second Time Around", *Data Communications*, vol. 22, No. 9, Jun. 1, 1993, pp. 69, 70, 72–74.

* cited by examiner

*Primary Examiner*—David Wiley
(74) *Attorney, Agent, or Firm*—Finnegan, Henderson, Farabow, Garrett & Dunner, L.L.P.

(57) ABSTRACT

A system and method for distributing and managing the flow of information between a plurality of networks uses a device that can receive voice and data signals simultaneously through a single communication point from a remote integrated voice/data network and distribute these signals to one or more end terminals connected to a local network. The device has a specific telephone number and an IP address for receiving voice and data signals from the remote network. Upon receiving voice and/or data signals, the device determines which end terminal connected to the local network is to receive the incoming signal and routes the signal to the appropriate terminal. The device can also transmit voice and data signals from the local network to the remote network and serve as a firewall for both incoming and outgoing transmissions.

19 Claims, 2 Drawing Sheets

Figure 1:
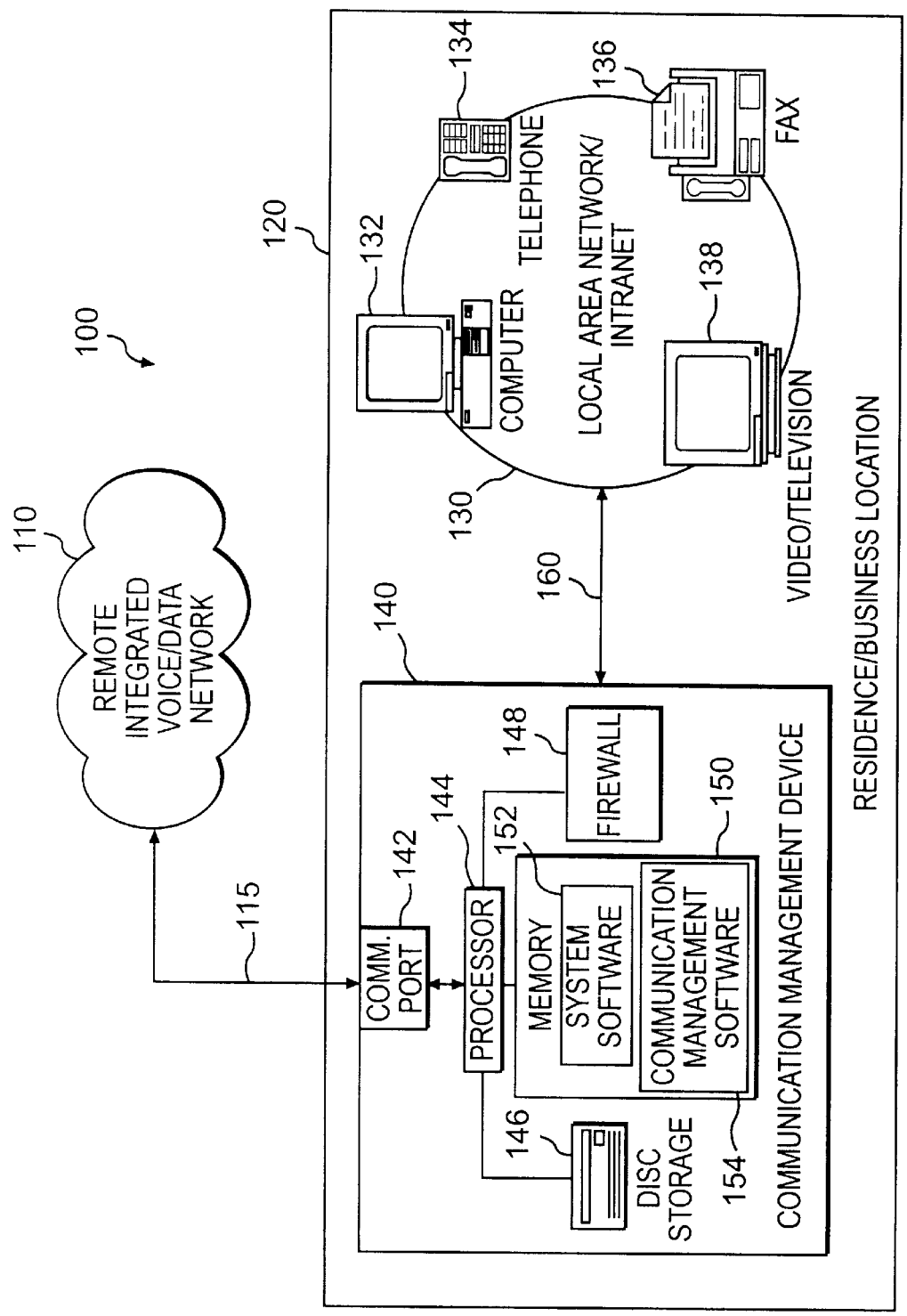

SYSTEMS AND METHODS FOR SIMULTANEOUS NETWORK MANAGEMENT OF VOICE AND DATA SIGNALS

BACKGROUND OF THE INVENTION

The present invention relates generally to communication networks, and more particularly to systems and methods for distributing and managing the flow of information between a plurality of networks through a device that can receive voice and data signals simultaneously from a remote network through a single communication point and distribute these signals to one or more end terminals connected to a local network.

With the growing popularity of the Internet, the desire to integrate voice and data communication networks to enhance multimedia services at the residential and business level is apparent. For example, many World Wide Web (WWW) users currently rely on their telephone lines to provide Internet access. However, the use of traditional telephone lines to provide Internet access presents a number of problems. First, additional hardware and software is necessary to support an Internet connection, (e.g., a modem and communication software) resulting in significant user costs. Second, each Internet connection typically means one less telephone line, thus requiring the user to choose between a limited number of communication options (e.g., Internet versus telephone).

In addition, the time necessary to connect to the Internet is burdensome. Each time a users wishes to access the Internet, they must logon through an Internet Service Provider (ISP) using Internet access software. This logon time can be significant if a user connects to the Internet many times during the day. Although some ISPs allow unlimited Internet access, they typically terminate a connection if a user is inactive for a specified period of time. Moreover, the speed of data transfer through a modem connected to an existing telephone line is limited. Thus, a user often becomes frustrated at the time it takes to download or upload files. Certainly, these problems limit the expansion of Internet services into a number of households and businesses.

Current solutions implemented by Internet users include relying on a single communication line for Internet and telephone access. A typical system configuration supporting this solution is a connection from a wall jack to a modem and a second connection from the modem to a telephone. This configuration, however, does not permit a user, for example, to talk on the telephone while connected to the WWW. Consequently, many users pay to have additional telephone lines installed at their location to not only support telephone and Internet access, but also support e-mail, facsimile machines, and video functions. This solution can be costly, however, since additional hardware and software is needed to support each additional telephone line and each terminal connected to the telephone line.

There are existing communication solutions that provide a single telephone number for telephone, facsimile machine, and messaging services. These solutions are offered by local telephone companies and digital wireless communication services (i.e., PCS). While these solutions consolidate multiple communication services through a single telephone number, they do not permit the transmission and receipt of voice and data signals simultaneously through a single communication point (i.e., a single unit for managing both voice and data transmissions simultaneously).

Another problem associated with current communication solutions includes having multiple communication service providers for a single residence or business. For example, many residential and business users have telephone service through a local telephone company and Internet service through an ISP. Some local telephone companies offer Internet services, but often not at competitive prices. Thus, users must pay each service provider for each service. This problem will further grow when cable television services are provided over the same communication medium as telephone and Internet services.

A further problem associated with current communication solutions is system maintenance. Many telephone companies provide maintenance services when a residential or business telephone system becomes inoperative. Usually, if the telephone company can not detect the problem remotely, they send a technician to the user location. Other communication companies provide similar maintenance services (e.g., cable TV companies). Nevertheless, the cost of on-site visits by multiple service technicians can be significant to a residential or small business customer.

As voice, Internet Protocol (IP), and wireless networks become integrated, there is a need for a system that can simultaneously support a variety of communication services (e.g., telephone, e-mail, facsimile machine, video/television, Internet, cable TV) in both a residential and business environment through a single communication device. There is also a need for such a system to provide instantaneous access to these communication services at reasonable operation and maintenance costs.

SUMMARY OF THE INVENTION

Systems and methods consistent with the present invention meet these desires by implementing a device that can receive voice and data signals simultaneously from a remote network through a single communication point and distribute these signals to one or more end terminals connected to a local network.

Specifically, a system for managing the flow of information between a plurality of networks comprises a first network capable of routing voice signals and data signals originating from a plurality of source terminals; a second network capable of routing the voice signals and data signals to a plurality of end terminals; and a communication management means for receiving the voice and data signals simultaneously from the first network through a single communication point and distributing the voice and data signals to at least one of the plurality of end terminals.

A method for managing the flow of information between a plurality of networks comprises receiving voice signals and data signals simultaneously at a communication management device through a single communication point from a first network; determining which one of a plurality of end terminals connected to a second network through the communication management device is to receive the voice signals and data signals; and distributing the voice signals and data signals to the determined end terminal over the second network.

Both the foregoing general description and the following detailed description are exemplary and explanatory and are intended to provide further explanation of the invention as claimed.

BRIEF DESCRIPTIONS OF THE DRAWINGS

The accompanying drawings, which are incorporated in and constitute a part of the specification, illustrate presently preferred embodiments of the invention and, together with the preceding general description and the following detailed description, explain the principles-of the-invention.

Figure 2:
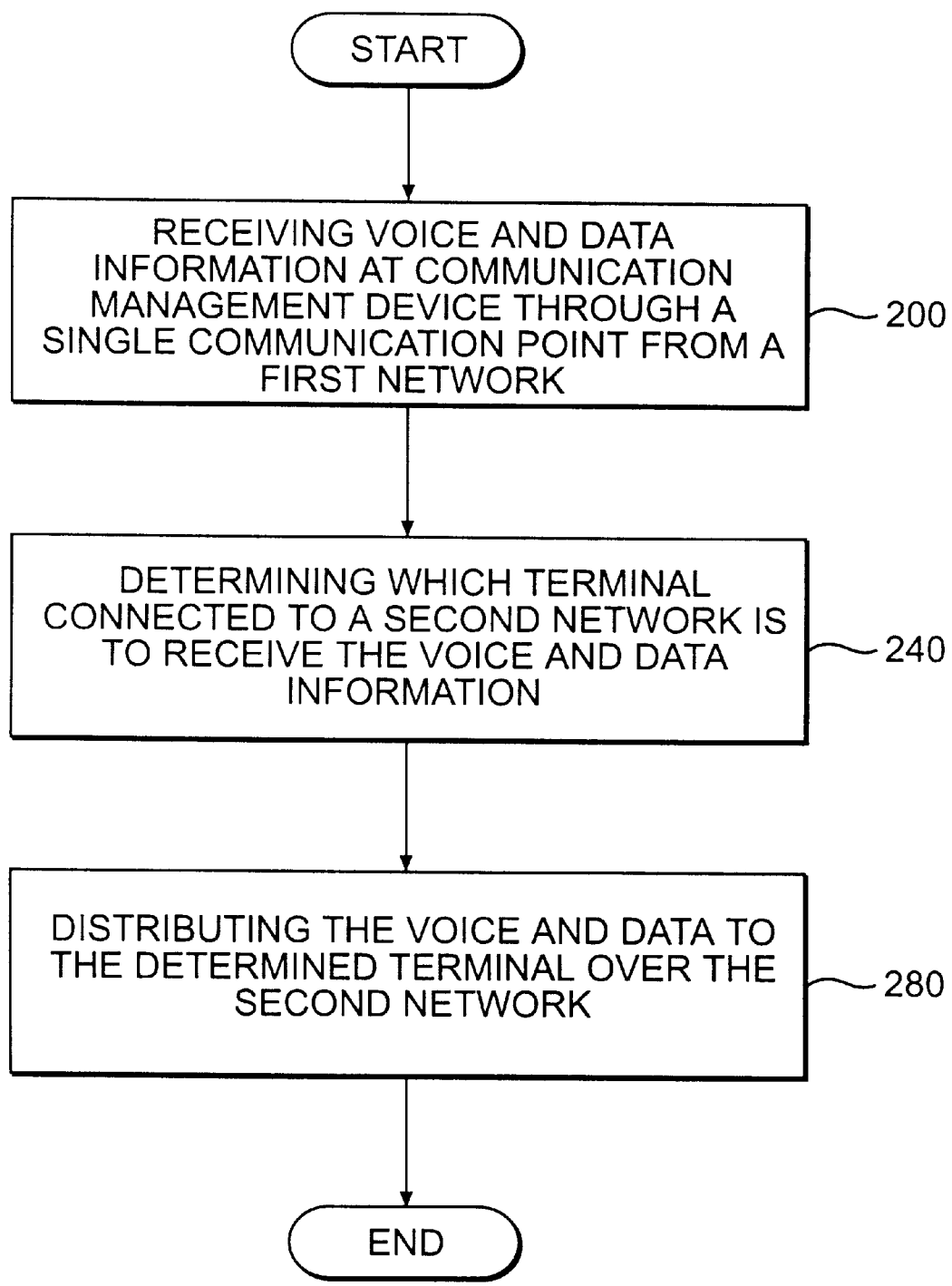

In the drawings:

FIG. 1 is a diagram of a communication management system consistent with the present invention; and FIG. 2 is a flowchart of a method, consistent with the present invention, for managing and distributing the flow of information between a plurality of networks.

DETAILED DESCRIPTION OF THE INVENTION

Systems and methods consistent with the present invention receive voice and data signals simultaneously from a remote network through a single communication point and distributes these signals to one or more end terminals connected to a local network. The remote network includes an integrated voice/data network that can send voice and data signals over a variety of transmission media (e.g., wireless link, cable TV lines, telephone lines, etc.). A communication management device positioned between the remote network and the local network has a telephone number and an IP address for receiving voice and data signals related to e-mail, telephone, facsimile machine, video/television, and Internet services. Depending on the type of signal received, the device forwards the signal to the appropriate end terminal connected to the local network.

FIG. 1 is a diagram of a communication management system 100 consistent with the present invention. Communication management system 100 includes a remote integrated voice/data network 110 connected to a residential/business location 120 that houses local area network 130 and communication management device 140. One skilled in the art will appreciate that remote integrated voice/data network 110 may connect to any location around the world that is configured to communicate with it through a wireline or wireless connection. For simplicity, only one residence/business location 120 is illustrated in the diagram of FIG. 1.

Remote integrated voice/data network 110 includes a broadband, wide area digital communication network optimized for IP. Specifically, remote integrated voice/data network 110 is supported by several wireless and wireline networks including the Internet, standard telephone lines, and cable TV lines, as well as, new data networks being developed and installed around the globe. An IP optimized communication network sends an electronic signal (similar to a dial tone) over existing communication channels that announces the immediate availability of telephone service, WWW pages, e-mail messages, faxes, video/television signals, home banking information, and other types of digitized information. This type of network signal eliminates the need, for example, to logon to an ISP every time a user accesses the Internet. The digitized information travels over remote integrated voice/data network 110 as multi-path voice packets for voice transmissions and as multi-path data packets for data transmissions. Multi-path voice and data packets can be routed over any type of network, providing an advantage over traditional single-path voice and data packets that must travel over respective dedicated network channels.

Residence/business location 120 illustrates one location from which to access remote integrated voice/data network 110. Residence/business location 120 can be a residence, business, or any other location configured to communicate with remote integrated voice/data network 110 through a wireline or wireless connection. As illustrated in FIG. 1, residence/business location 120 includes a local area network 130 which communicates with remote integrated voice/data network 110 via communication management device 140.

Local area network 130 includes a plurality of end terminals that facilitate the transmission and receipt of voice and data signals between remote integrated network 110 and residence/business location 120. In particular, local area network 130 includes a computer 132, a telephone 134, a fax machine 136, and a video/television display 138. One skilled in the art will appreciate that end terminals may be added and removed from local area network 130 as appropriate for the user environment. In addition, local area network 130 may have any configuration consistent with the present invention. Each end terminal allows a user to view and/or hear voice and data signals received from remote integrated voice/data network 110 via communication management device 140.

Communication management device 140 serves as a gateway between remote integrated voice/data network 110 and local area network 130. That is, voice and data signals sent to or received from remote integrated voice/data network 110 pass through communication management device 140, which manages and distributes the voice and data signals. Each residence/business location that communicates with remote integrated voice/data network 110 in a manner consistent with the present invention includes communication management device 140, which consists of a communication port 142, processor 144, disc storage 146, firewall 148, and memory 150. Communication management device 140 may include other components such as wall mounting brackets and a primary/backup power supply. Communication management device 140 can be installed at virtually any communication access point of a building.

Communication port 142 sends and receives digital voice and data packets between communication management device 140 and remote integrated voice/data network 110. Specifically, communication port 142 serves as a single communication point for sending and receiving all types of information (e.g., voice, IP, and video/television) over communication channel 115, which may be a wireline or wireless communication channel. Using a single communication point to send and receive information eliminates the need to install multiple dedicated communication lines for each form of information or service (e.g., telephone and Internet) received at the residence/business location. To facilitate this operation, communication port 142 recognizes an incoming telephone number and IP address associated with communication management device 140.

Processor 144 controls the operation of communication management device 140 including communications with external networks and components (e.g., remote integrated voice/data network 110 and local area network 130). Upon receiving voice and data signals via communication port 142, processor 144 processes this information and sends it to a storage device in communication management device 140 (e.g., software upgrade) or distributes it to one or more components connected to local area network 130. In addition, processor 144 is programmable to facilitate customized communication management device 140 operation.

Disc storage 146 communicates with processor 144 to implement applications stored on disc. Preferably, disc storage 146 is an optical reader system with high speed access capability. One skilled in the art will appreciate, however, that disc storage 146 can be any type of disc storage system (e.g., magnetic). Disc storage 146 allows a user to upgrade communication management device 140 software and reconfigure existing software features.

Firewall 148 prevents unauthorized access to and from local area network 130. Firewall 148 may include both hardware and software implementations to protect local area network 130 from eavesdroppers, hackers, and other Internet users with malicious intent. Specifically, firewall. 148 analyzes each packet of information entering and leaving communication management device 140 and accepts or rejects it based on user defined rules. One skilled in the art will appreciate that other firewall techniques may be implemented in firewall 148 to protect local area network 130 from unauthorized access. All transmissions entering and leaving communication management device 140 pass through firewall 148. However, firewall 148 may be deactivated or modified as desired to provide less local area network 130 protection.

Memory 150 is a random access memory that communicates with processor 144 during communication management device 140 operation. Preferably, memory 150 facilitates high speed access to allow immediate processing of incoming and outgoing information (i.e., voice and data signals). To process this information, processor 144 implements system software 152 and communication management software 154 stored in memory 150.

System software 152 includes executable code that, when implemented by processor 144, monitors the operation of 140. Communication management device 140 may be configured by a user to perform customized operations by simply reprogramming system software 152. This feature allows a residential user, for example, to upgrade the operation of communication management device 140 with, a new software version, or add or remove components from communication management device 140 to comply with a specific user environment (e.g., upgrade firewall, change disc storage).

Communication management software 154 includes executable code that, when implemented, manages and distributes the flow of traffic through communication management device 140. Specifically, communication management software 154 analyzes incoming information and distributes it to the appropriate device on local area network 130 over communication channel 160. Communication management software 154 also routes outgoing information to remote integrated voice/data network 110 via communication channel 115. The specific functions of communication management software 154 are detailed below with respect FIG. 2.

FIG. 2 is a flowchart of a method, consistent with the present invention, for managing and distributing the flow of information between a plurality of networks. The method begins with receiving voice and data information at communication management device 140 through a single communication point from remote integrated voice/data network 110 (step 200). Since communication management device 140 has both a telephone number and IP address, it can receive and transmit digital voice and data information simultaneously through communication port 142 (i.e., the communication point). Thus, a user can talk on telephone 134 while surfing the WWW on computer 132. This feature significantly reduces installation costs for residential and business customers while providing a variety of multimedia service options.

Upon receiving voice and data signals, communication management device 140 determines which terminal connected to local area network 130 is to receive the voice and data information (step 240). Communication management software 154 analyzes the incoming information to detect voice and data information. That is, when voice and data packets are received (either simultaneously or separate), communication management software 154 analyzes each packet to determine its media type. For example, if an incoming multi-path data packet includes information written in hypertext markup language (HTML), communication management software 154 will identify the information as a webpage.

Once the information is identified, communication management software 154 distributes the voice and/or data information to the appropriate end terminal on local area network 130 (step 280). For example, if communication management software 154 determines that the information is a webpage, it can send the information to computer 132 over communication channel 160. Communication management software 154 includes the address of each end terminal on local area network 130 for routing purposes.

Communication management device 140 can repeat the foregoing steps as necessary to handle incoming and outgoing communications. For outgoing communications, remote integrated voice/data network 110 provides an electronic signal tone to communication management device 140 which permits immediate Internet access. Thus, a user can make a call from telephone 134 over the Internet and eliminate long distance telephone charges. Moreover, with direct Internet access, a user no longer needs to logon through an ISP, resulting in faster data transfer speeds. That is, communication management device 140 operates as an ISP.

A company providing the electronic signal tone to communication management device 140 may also offer a variety of services to a user. These services may include email, fax, telephone, video/television, WWW, and other communication services (e.g., utility monitoring, home security, telephone answering system). A customer can subscribe to one or more of these services as desired. Since all of these services are provided to the user through communication management device 140, troubleshooting and maintenance costs can be minimized. For example, the service providing company can proactively monitor communication management device 140 from a remote location by constantly checking the communication link therebetween. If an error is detected, the service providing company can attempt to correct the problem remotely. If the problem must be fixed on-site, maintenance personnel only have to repair or replace communication management device 140.

Systems and methods consistent with the present-invention provide,a single communication device that can simultaneously support a variety of communication services (e.g., telephone, e-mail, facsimile machine, video/television, WWW, cable TV) in both a residential and business environment. The system further provides instantaneous access to multimedia services for minimal operation and maintenance costs. Moreover, the system can be upgraded to provide additional multimedia services to a customer and reconfigured to support different user environments.

While only some embodiments and methods consistent with the present invention have been described, those skilled in the art will understand that various changes and modifications may be made to these embodiments, and equivalents may be substituted for elements in these embodiments, without departing from the true scope of the invention.

In addition, many modifications may be made to adapt a particular element, technique or implementation to the teachings of the present invention without departing from the central scope of the invention. Therefore, this invention should not be limited to the particular embodiments and methods disclosed herein, but should include all embodiments falling within the scope of the appended claims.

What is claimed is:

1. A system for managing the flow of information between a plurality of networks, comprising:
   a wide area network providing voice signals and data signals;
   a local area network capable of routing voice signals and data signals to a plurality of end terminals; and
   communication management means, coupled between the wide area network and the local area network, for simultaneously receiving voice signals and data signals from the wide area network through a single communication point, analyzing the received voice signals and data signals for determining a signal type, and for distributing the voice signals and data signals to the appropriate end terminals based upon the signal type.

2. The system of claim 1 wherein the communication management means includes a processor.

3. The system of claim 1 wherein the communication management means includes a memory.

4. The system of claim 1 wherein the communication management means has a telephone number address and an Internet protocol address.

5. The system of claim 1 wherein the communication management means includes a firewall.

6. The system of claim 1 wherein the communication management means includes a communications port.

7. The system of claim 1 wherein the communication management means includes a disc storage device.

8. A communication management device for managing the flow information between a plurality of networks, comprising:
   a memory;
   a processor in communication with the memory; and
   communication management means for receiving voice signals and data signals simultaneously from a remote network through a single communication point, analyzing the received voice signals and data signals for determining a signal type, and distributing the voice signals and data signals to at least one of a plurality of end terminals connected to a local network based on the signal type.

9. The communication management device of claim 8 wherein the memory is a random access memory.

10. The communication management device of claim 8 wherein the remote network is a wide area network.

11. The communication management device of claim 8 wherein the local network is a local area network.

12. The communication management device of claim 8 wherein the communication management means includes a telephone number and an Internet protocol address.

13. A method for managing the flow of information between a plurality of networks, comprising:
   receiving voice signals and data signals simultaneously at a communication management device through a single communication point from a first network;
   analyzing the received voice signals and data signals for determining a signal type; and
   distributing the voice signals and data signals to one of a plurality of end terminals connected to a second network through the communication management device based on the signal type.

14. The method of claim 13 further comprising routing voice information to a telephone number address associated with the communication management device.

15. The method of claim 13 further comprising routing voice information to an Internet protocol address associated with the communication management device.

16. The method of claim 13 wherein determining includes:
   determining the format of the voice and data information; and
   identifying at least one of the plurality of end terminals capable of outputting the voice and data information in the determined format.

17. The method of claim 16 wherein determining includes determining whether the format of the voice and data information is one of voice, voicemail, electronic mail, video, telephone, and facsimile.

18. The method of claim 13 further comprising:
   sending voice and data information from at least one of the plurality of end terminals to the communication management device; and
   transmitting the voice and data information through a firewall to the first network.

19. The method of claim 18 wherein transmitting includes determining the format of the voice and data information before transmitting to the first network.

* * * * *